B. D. PINKNEY.
WEIGHING APPARATUS.
APPLICATION FILED OCT. 12, 1916.
1,240,600.
Patented Sept. 18, 1917.
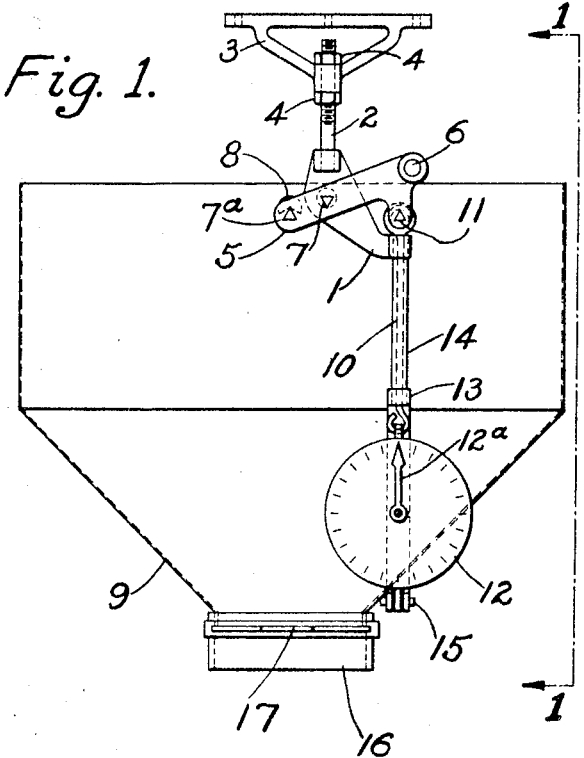
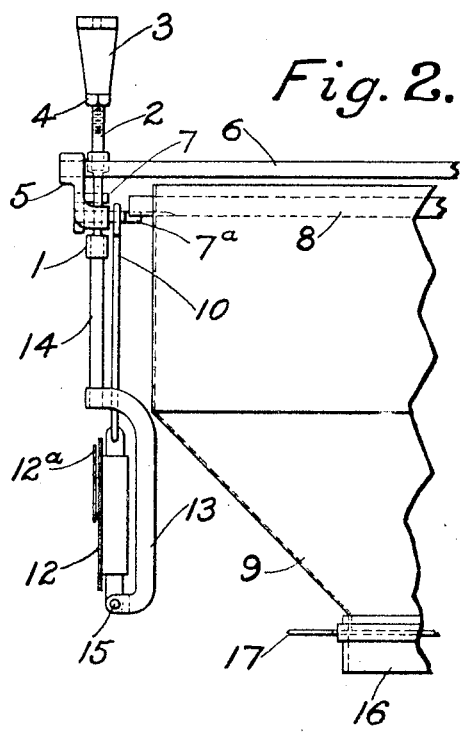
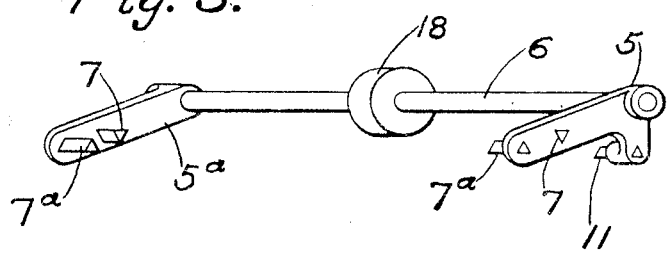
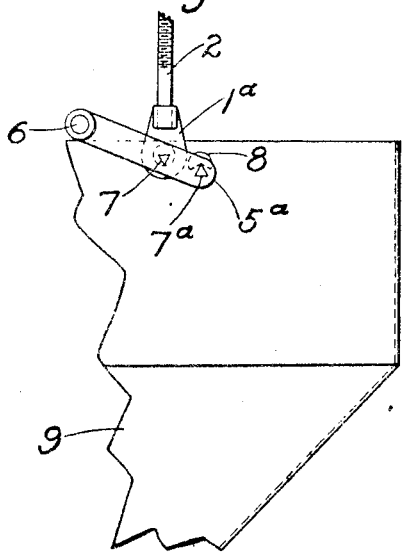
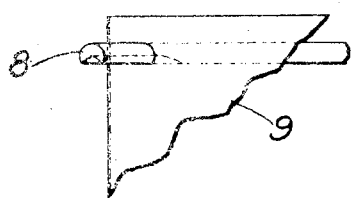
Witnesses:
Ed. W. Heckel
Esther Dornette
Inventor:
Bryan D. Pinkney

UNITED STATES PATENT OFFICE.

BRYAN D. PINKNEY, OF CINCINNATI, OHIO, ASSIGNOR TO THE TRIUMPH MANUFACTURING COMPANY, OF CINCINNATI, OHIO, A CORPORATION OF OHIO.

WEIGHING APPARATUS.

1,240,600.  Specification of Letters Patent.  Patented Sept. 18, 1917.

Application filed October 12, 1916.  Serial No. 125,276.

*To all whom it may concern:*

Be it known that I, BRYAN D. PINKNEY, a citizen of the United States, residing at Cincinnati, in the county of Hamilton and State of Ohio, have invented a new and useful Weighing Apparatus, of which the following is a specification.

My invention relates to improvements in an apparatus for weighing flour or other materials or liquids and registering, or indicating, the weight of same on a dial-scale; and the object of my invention is to provide a weighing apparatus that will be direct reading, by using a dial-scale of a familiar construction that registers the load as it is applied, in contrast to the ordinary beam-type scale which is composed of a scale-beam and poises, and which type only registers the load when the exact predetermined amount is scaled, or weighed.

One of the objects of my invention is to provide a means for weighing a load and registering said load, and at the same time provide a leverage ratio so that the resistance at the dial-scale is less than the load applied, that is, the graduations of the dial-scale are relative, depending upon the exact lever ratio used.

A further object of my invention is to provide a self-contained weighing apparatus in which all parts of the weighing mechanism are fastened to the weighing apparatus, eliminating the ordinary so-called tension rods that connect the scale with the hopper at some remote point, and substituting therefor a strut, or compression member, which compression member makes the weighing apparatus self-contained.

To the accomplishment of the above and related ends, said invention, then, consists of the means hereinafter fully described and particularly pointed out in the claim.

I attain these objects by the apparatus illustrated in the accompanying drawing, in which—

Figure 1 is a front view of my improved weighing apparatus; Fig. 2, a partial end view looking in the direction indicated by the arrows at line 1—1, Fig. 1; Fig. 3, a perspective view of the leverage member; Fig. 4, a partial view of the rear hanger hook; Fig. 5, a perspective view showing in partial detail the hopper scale bar which supports said hopper in the leverage member.

Similar numerals refer to similar parts throughout the several figures.

Referring to the drawing, the suspension hooks 1, 1ª, secured to the ends of the suspension rods 2 2, and adjustably mounted in suspension hangers 3, 3, with adjusting nuts 4, 4, 4, 4, support the leverage arms 5, 5ª, leverage arm rod 6, rigidly fastened in leverage arms 5, 5ª, and pivots 7, 7ª, said pivots 7 being pivoted in suspension hooks 1, 1ª, and pivots 7ª supporting the hopper pivot rod 8, which carries the hopper 9, in which the material is placed that is to be weighed. A valve 16, in which works a damper or slide 17, is provided, to permit the weighed load to be discharged.

The operation of my weighing apparatus is as follows:—The load is placed in the hopper 9, usually very gradually as the material generally is flour that has just been blended and sifted. This load reacts upon the leverage arms 5, 5ª, causing the end where the load is applied (at pivot 7ª) to become depressed and the part of the leverage arms 5, 5ª, beyond the pivot 7, to raise at the lower end the corresponding amount. Pull-rod 10, fastened to a dial-scale 12, of familiar construction, hence not described in detail here, is actuated upon by pivot 11, through said upward movement of leverage arms 5, 5ª, and as the load is increased, the more the amount the pull-rod 10 travels upwardly and the greater the arc of travel of the dial-scale finger 12ª, which finger indicates, points out, or registers, the load.

To hold the dial-scale 12 while the pull of the pull-rod 10 is being exerted, compression member bracket 13, is fastened at the lower end of compression member 14, the upper end of said compression member being fixed rigidly in suspension hook 1; the lower lug of dial-scale 12 is mounted on pin 15, said pin being pivoted in compression member bracket 13; the upper lug of the dial-scale 12, through which the pull-rod 10 is pivoted, being the flexible member of the dial-scale which actuates the dial-scale mechanism, said mechanism not being illustrated.

The distance from pivot 7, to pivot 7ª, is less than from pivot 7ª, to pivot 11, so that a lever ratio, preferably a two to one ratio, exists between the load and the dial-scale, in consequence of which (assuming a two to one ratio). while a load of one thousand pounds may be placed in the hopper the reaction at the dial-scale is five hundred pounds, and a five hundred pound dial-scale may be used, but graduated of course, for one thousand pounds, as that is the load being balanced or weighed. This lever-ratio feature eliminates the necessity of a powerful spring in the dial-scale, causing the hopper to articulate with greater precision.

A counterweight 18, may be used to get a perfect zero balance when the hopper is empty providing the relative weights are not otherwise in balance, for I have found that, generally, the hopper is heavier than the counterbalancing parts.

Having described my invention, what I claim as new and desire to secure by Letters Patent, is—

In a weighing apparatus, the combination comprising a hopper provided with a pivot rod, a supporting standard provided with suspension hooks, a leverage member pivotally trunnioned in said suspension hooks and pivotally connected to said pivot rod, a pull-rod pivotally connected to said leverage member, a compression member connected with one suspension hook, and a dial-scale connected to said compression member and to said pull-rod; substantially as described.

In testimony whereof I have hereunto set my hand in presence of two subscribing witnesses.

BRYAN D. PINKNEY.

Witnesses:
ESTHER DORNETTE,
RAYMOND DECKER.